(12) United States Patent
Barr et al.

(10) Patent No.: US 10,145,504 B2
(45) Date of Patent: Dec. 4, 2018

(54) BRACKET MOUNTING TOOL FOR WINDOW COVERS

(71) Applicants: Douglas J. Barr, Broomfield, CO (US); Leo J. Lesperance, Erie, CO (US)

(72) Inventors: Douglas J. Barr, Broomfield, CO (US); Leo J. Lesperance, Erie, CO (US)

(73) Assignee: Hunter Douglas Inc., Pearl River, NY (US)

( * ) Notice: Subject to any disclaimer, the term of this patent is extended or adjusted under 35 U.S.C. 154(b) by 484 days.

(21) Appl. No.: 14/692,734

(22) Filed: Apr. 21, 2015

(65) Prior Publication Data

US 2016/0311087 A1 Oct. 27, 2016

Related U.S. Application Data

(60) Provisional application No. 61/982,031, filed on Apr. 21, 2014.

(51) Int. Cl.
*B23P 15/00* (2006.01)
*F16M 13/02* (2006.01)
*B25B 31/00* (2006.01)

(52) U.S. Cl.
CPC ............. *F16M 13/02* (2013.01); *B25B 31/00* (2013.01)

(58) Field of Classification Search
CPC ... B23Q 1/00; B23Q 1/03; B23Q 1/01; B23Q 1/23; B23Q 3/00
See application file for complete search history.

(56) References Cited

U.S. PATENT DOCUMENTS 5,392,508 A * 2/1995 Holliday ................. B25B 27/10
29/280
8,931,153 B1 * 1/2015 Kimminau .............. B25B 13/48
29/255
2016/0311087 A1 * 10/2016 Barr ........................ B25B 31/00

* cited by examiner

*Primary Examiner* — Lee D Wilson
(74) *Attorney, Agent, or Firm* — Kilpatrick Townsend and Stockton LLP

(57) ABSTRACT

A bracket installation tool includes a tool body having a length extending along a longitudinal axis of the body, a proximal end, and a distal end. The body defines a longitudinal slot extending along the length. The body includes a body mating feature disposed along the longitudinal slot. A handle is coupled with the proximal end and a receiver hitch is coupled with the distal end. The receiver hitch is configured to receive a portion of a bracket for a window covering. A stop is slidably engaged with the slot along the length. The stop includes a lock mechanism. When in a locked configuration, a lock mating feature of the lock mechanism engages the body mating feature to fix a location of the stop. When in a free configuration, the mating features are disengaged such that the lock mechanism and the stop are slidable within the slot.

15 Claims, 11 Drawing Sheets

BRACKET MOUNTING TOOL FOR WINDOW COVERS

CROSS-REFERENCES TO RELATED APPLICATIONS

This application claims priority to U.S. Provisional Patent Application No. 61/982,031 filed Apr. 21, 2014, entitled "BRACKET MOUNTING TOOL FOR WINDOW COVERS," the entire disclosure of which is hereby incorporated by reference, for all purposes, as if fully set forth herein.

BACKGROUND OF THE INVENTION

The installation of window shades requires the installer to consider many factors at once, and can be a cumbersome and time consuming endeavor. The window covering must be properly aligned with the opening in the wall or other structure. This involves measuring a proper depth for the window covering relative to the opening, as well as ensuring that the window covering is installed square relative to the opening. A typical window covering installation involves snapping a bracket onto a headrail of the window covering to define how far back bracket needs to be within the opening and then marking the location for the bracket. The installer must then hold the bracket in one hand and screw the bracket into the window opening with the other hand while trying to keep the bracket square with an outer edge of the window opening. The installation process can be difficult to complete, leaving the installer with a single free hand to complete all tasks as the bracket is held with the other hand. Such installation tasks can include making necessary lateral and/or depth measurements and corresponding markings, aligning the bracket and/or the window covering, drilling any necessary holes in the window opening, and fastening the bracket within the opening. In some cases, to ensure a proper installation, multiple people are needed. Typical window coverings can include three, four, or more window brackets. Securing all of these brackets with the proper depth and alignment can prove to be very time consuming. Improvements in installation of such window coverings are desired.

BRIEF SUMMARY OF THE INVENTION

Embodiments of the present invention serve to provide systems and methods to make the installation of window coverings more efficient. Bracket installation tools are provided which have a bracket receiving slot or hitch that may hold a window bracket during the installation process. A stop mechanism can be included to set an installation depth of the bracket and to help maintain the bracket in a position square relative to the window opening. In some embodiments, the stop may be adjustable such that installation of brackets on different window sizes and/or in different positions relative to a window may be easily performed. Such bracket tools can decrease the installation time for window coverings, as well as make the job easier for a single installer.

In one aspect, a bracket installation tool is provided. The tool may include a tool body having a length extending along a longitudinal axis of the tool body, a proximal end, and a distal end. The tool body may define a longitudinal slot extending along at least a portion of the length. The tool body may include a body mating feature disposed along the longitudinal slot. The tool may also include a handle coupled with the proximal end of the tool body and a receiver hitch coupled with the distal end of the tool body. The receiver hitch may be configured to receive a portion of a bracket for a window covering. The tool may further include a stop slidably engaged with the slot such that the stop is slidable along the at least a portion the length of the tool body. The stop may include a lock mechanism. When in a locked configuration, a lock mating feature of the lock mechanism engages the body mating feature to fix a location of the stop such that the bracket is maintained at a desired mounting site relative to a surface of a window casement when a distal surface of the stop is positioned adjacent the surface. When in a free configuration, the lock mating feature and the body mating feature are disengaged such that the lock mechanism and the stop are slidable within the slot.

In another aspect, a method of installing a window blind mounting bracket using a bracket installation tool is provided. The method may include providing a bracket installation tool. The tool may include a tool body having a length, a proximal end, and a distal end. The tool may also include a handle coupled with the proximal end of the tool body and a receiver hitch coupled with the distal end of the tool body. The receiver hitch may be configured to receive a portion of a bracket for a window covering. The tool may further include a stop extending from the tool body. The method may also include inserting the portion of the bracket within the receiver hitch such that a portion of the bracket configured to receive a fastener is exposed and adjusting a location of the stop relative to the length of the tool body. The bracket installation tool may be positioned such that a distal surface of the stop is adjacent a surface of a window casing to maintain the bracket in a desired position relative to the window casing. The method may further include securing the bracket with the window casing using a fastener and releasing the bracket from the receiver hitch.

In another aspect, a bracket installation tool is provided. The tool may include a tool body having a length, a proximal end, and a distal end. The tool may also include a handle coupled with the proximal end of the tool body and a receiver hitch coupled with the distal end of the tool body. The receiver hitch may be configured to receive a portion of a bracket for a window covering. The tool may further include a stop extending from the tool body. The stop may be slidable along the length of the tool body to set a location of the bracket relative to a surface of a window casement when a distal surface of the stop is positioned against the surface.

DETAILED DESCRIPTION OF THE INVENTION

Figure 1:
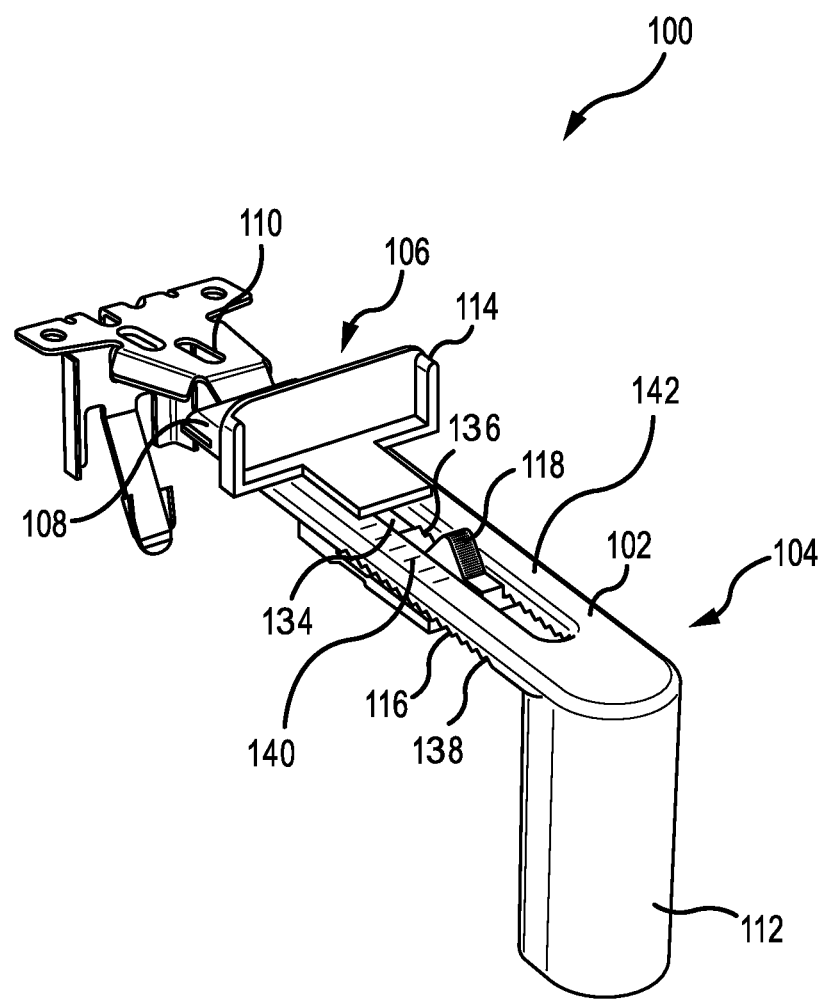
FIG. 1 shows an isometric view of the bracket installation tool of FIG. 1 according to embodiments.
Figure 2:
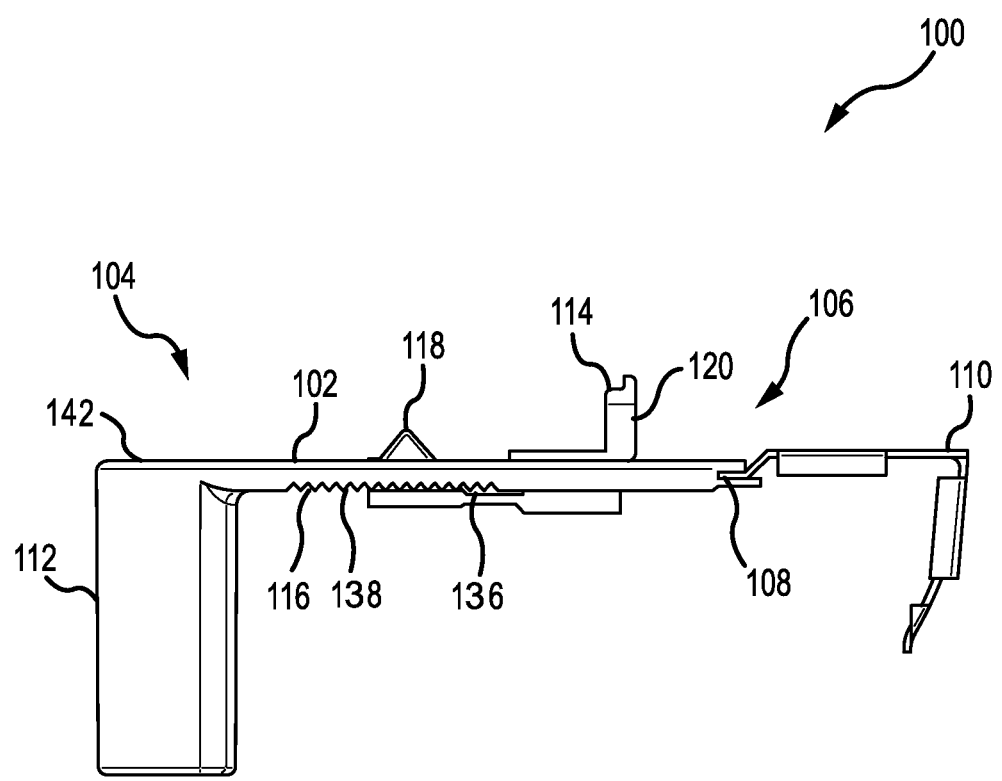
FIG. 2 shows a side elevation view of the bracket installation tool of FIG. 1 according to embodiments.
Figure 3:
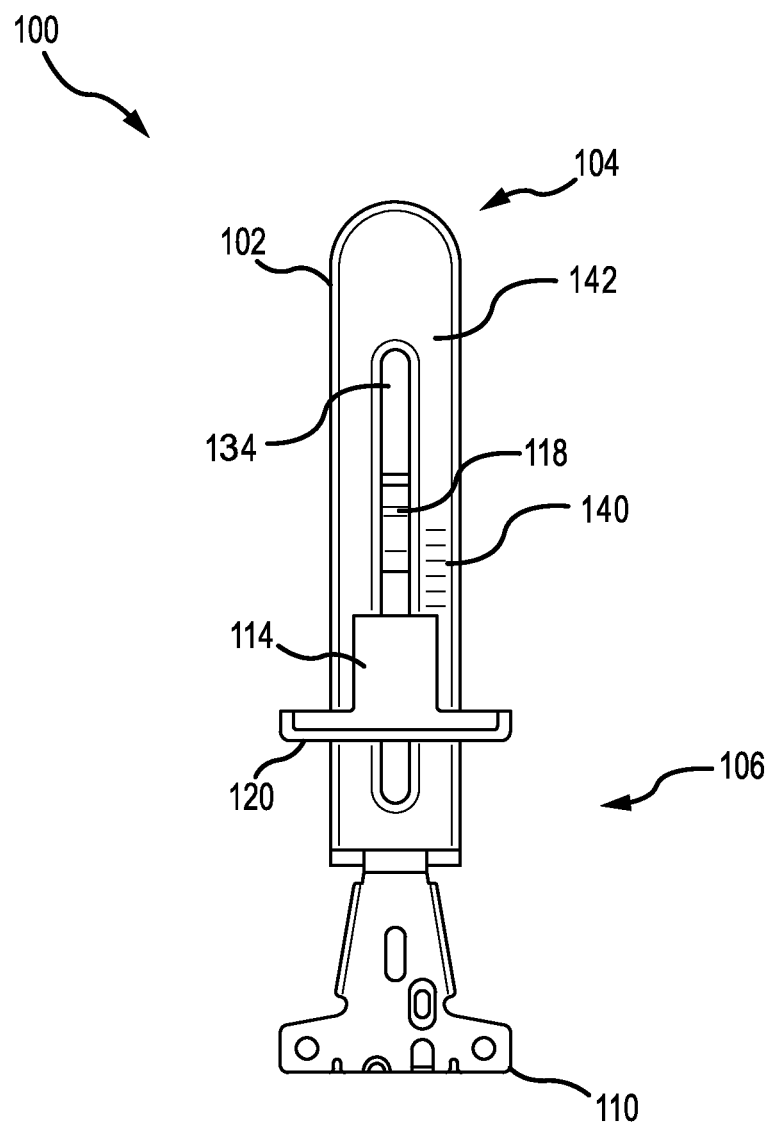
FIG. 3 shows a top view of the bracket installation tool according to embodiments.
Figure 4:
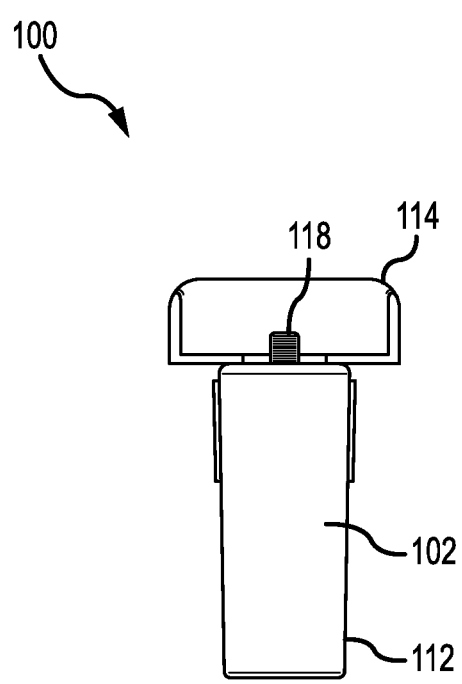
FIG. 4 shows a front view of the bracket installation tool according to embodiments.

In some embodiments, bracket installation tools for installing window covering brackets for deep casement windows are provided, although it will be appreciated that the tools described herein may be utilized in installations of brackets for other window types and/or for non-window applications. Bracket installation tools are provided which receive window cover brackets and help position the brackets in a proper, aligned position without the need for measuring and marking positions. The tools are often adjustable, such that installation of brackets on different window sizes and/or in different positions relative to a window may be easily performed. Such bracket tools can decrease the installation time for window coverings, as well as make the job easier for a single installer.

Tool 100 can include a body 102 having a length extending longitudinally between a proximal end 104 and a distal end 106. Body 102 may include a hitch 108 positioned near distal end 106. Hitch 108 may define an opening extending through a portion of distal end 106 that is completely or partially surrounded by the longitudinally extending tool body 102. The hitch 108 is configured to receive a portion of a bracket 110 within the opening. For example, an arm or flange of bracket 110, such as a flange used to secure a window cover within the bracket 110, may be inserted into the opening of hitch 108. Bracket 110 is held within hitch 108 such that a portion of the bracket to be mounted, such as one or more apertures, remains exposed when held by tool 100. This enables the bracket 110 to be secured to a surface while being secured in place by tool 100. Bracket 110 can be held within hitch 108 with a slip fit, snap in fit, friction fit, magnetically held, and/or can be secured or held in place using any other known method. Bracket 110 can be configured to support a window covering. As one example, a blind or other window cover may slide and/or snap into one or more brackets to secure the window cover to a window casement or other structure. In some embodiments, hitch 108 can be configured to receive multiple shapes, sizes, and/or orientations of brackets 110. This may be done, for example, by hitch 108 having a cross-section that varies along a width of the hitch 108 such that a center portion may be sized and shaped to securely receive a first bracket feature. The hitch 108 may include an outer portion that is sized and/or shaped to receive a second bracket feature that is different from the first bracket feature. In other embodiments, an adjustment feature, such as one or more set screws extending at least partially through hitch 108, may be used to secure the bracket 110 within the hitch 108. In this manner, the hitch 108 may be sized and shaped to receive any kind of bracket, and the set screw may be used to secure the bracket 110 within the hitch 108. Some slots 108 will be sized and shaped to receive only a specific bracket or bracket feature.

Figure 7:
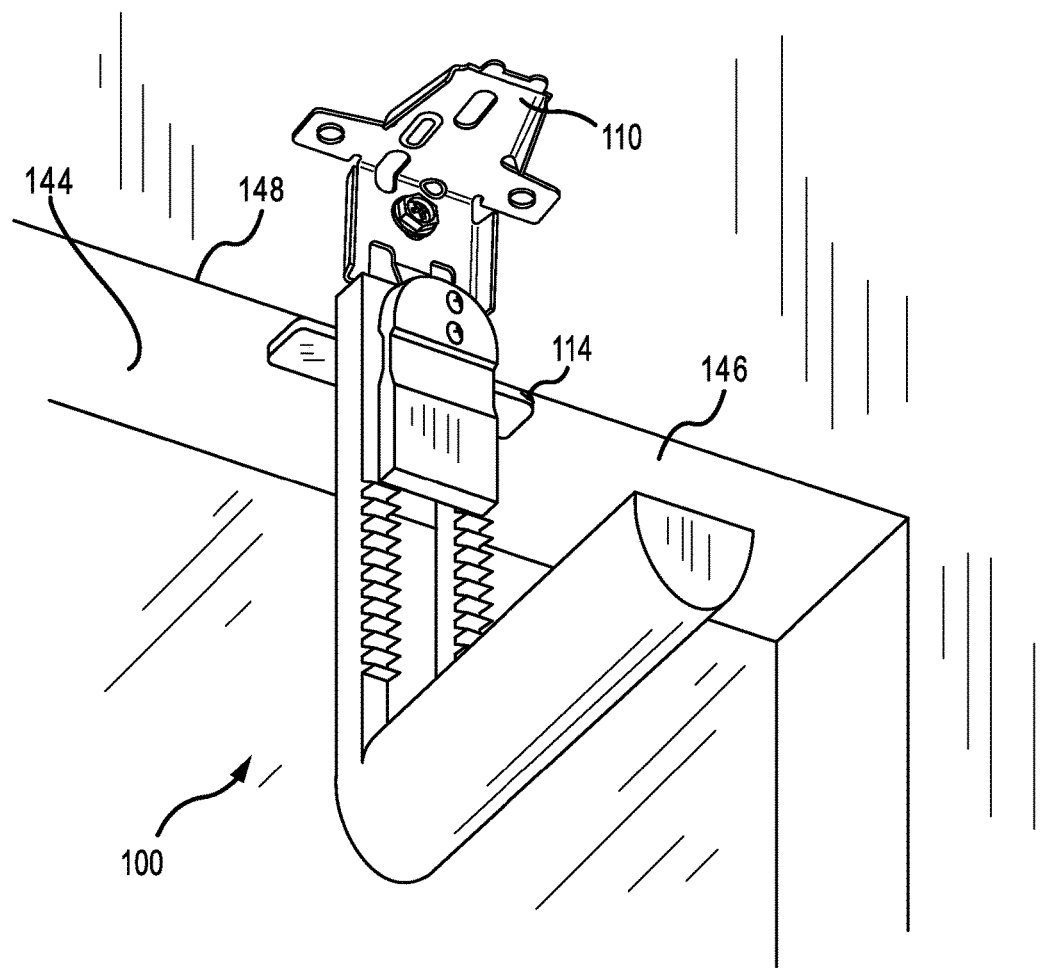
FIG. 7 shows a bracket installation tool holding a bracket in an outside mount configuration according to embodiments.

In some embodiments, the tool body 102 and/or hitch 108 may be coupled with a removable adapter to receive various sizes and shapes of brackets 110 such that the same tool 100 may be used to install inside mount, outside mount, and/or end mount brackets 110 for window coverings. As one example, an adapter configured to securely receive a specific bracket type may have a flange that is insertable into hitch 108. An adapter may define an adapter opening within which a portion of the bracket may be received. In other embodiments, an adapter may snap on, be magnetically coupled with, or otherwise be secured to the tool body. For example, a bottom 128 of bracket 110 may be held by the tool 100 in an outside mount application as shown in FIG. 7. An adaptor may also be configured to hold one or more portions of the bracket 110 at different angles to enable the installation tool 100 to be used for the various installation configurations. The tool 100 may include additional alignment mechanisms to accommodate alternative installation configurations. For example, a portion of the tool body 102 containing hitch 108 may be pivotable from side to side and/or up and down to accommodate different angled brackets. In some embodiments, the tool 100 may also be configured to secure and/or align fitting components, such as spacer blocks and extension brackets.

The tool body 102 can further include a handle 112. While shown here as a cylindrical extension positioned transversely or orthogonally relative to the longitudinal axis of the tool body 102, handle 112 can be shaped and sized in any manner, and in some embodiments may be adjustable in size or in angle relative to tool body 102. For example, handle 112 may telescope for length adjustment and/or may be coupled to the tool body 102 via a pivotable connection, such as a hinge or a ball and socket joint that permits movement in multiple directions. A pivot lock may be included to maintain a desired position of the handle 112. In some embodiments, handle 112 may be formed integral with the tool body 102, while in other embodiments the handle may be a separate component. Handle 112 may include a solid cylindrical or otherwise consistently shaped piece. In other embodiments, handle 112 may be contoured and/or include one or more indentations for a user's fingers, making the handle 112 more ergonomic. Additionally, handle 112 may include a soft and/or textured grip for both comfort and ease of use. Handle 112 is gripped by an installer to position the tool 100 and bracket 110 within an opening for a window during installation of the window covering. For example, the installer may hold the tool 100 by handle 112 with one hand while drilling holes for the bracket within the opening and/or while securing the bracket at a desired position within or around the opening. Additionally, the handle 112 may be used to pull the tool 100 away from the secured bracket 110 such that the bracket 110 can be released from the hitch 108 once secured in a desired position. The tool 100 may then be used to install another bracket or a window cover may be secured within the installed brackets.

In some embodiments, tool 100 further includes a stop 114. Stop 114 can be configured to set a height, depth, and/or other position for the bracket installation, as well as to square the bracket 110 relative to a surface of the window opening. Stop may be configured to have a distal surface 120 that is substantially transverse or orthogonal to the longitudinal axis of the tool body 102. This ensures that when tool 100 is positioned with the distal surface 120 substantially flush and/or adjacent a surface of a window casing or other mounting surface, that bracket 110 is square to a surface of the window casing. In some embodiments, stop 114 is sufficiently large to provide a stable surface to brace tool 100 against the window casing. In some embodiments, the distal surface 120 may include rubber and/or another non-slip surface to help maintain the position of the tool 100 when in place against a window casing. In some embodiments, stop 114 can be fixed at a predetermined depth for a specific type of bracket, window covering, and/or alignment with an outer edge of the opening, such as in an inside mount application. In other embodiments, stop 114 can be adjustable such that the depth of the bracket installation can be changed for various installations. For example, the stop 114 may be set at a position near the proximal end 104 of tool 100 to set the bracket 110 and window covering at a recessed position within the opening. Stop 114 can be set at a position near the distal end 106 of tool 100 to have the bracket 110 and window covering protrude out from the opening. Stop 114 can be set at intermediate positions to set the bracket 110 and window covering at lower levels of projection or recession relative to the outer edge of the opening or to position the window covering flush with the outer edge of the opening. Stop 114 may also be used to set a height of a bracket 110, such as for window cover systems positioned over a window casement in outside mount applications. In such embodiments, the stop 114 may be positioned against a top interior surface of a window casement.

The position of stop 114 can be adjusted by being moved along the tool body 102, such as by sliding along a track or slot 134. The stop 114 may be secured in position, for example, using a friction imparting device or other mating feature. For example, a lock mechanism 116 may slide within slot 134 and secure stop 114 in a desired position. Lock mechanism 116 may be coupled with and/or formed integral with stop 114, and may include a lock mating feature 136 that may engage with a tool mating feature 138 of tool body 102. In some embodiments, the mating features 136 and 138 may include intermeshed teeth, such as one or more rows of teeth extending along at least a portion of the length of the tool body 102, although any other mounting features and/or orientations may be utilized. An actuator, such as a trigger, a button, a screw, or other mechanism can be used to secure the stop 114 in a desired position and/or to release the stop 114, enabling the stop 114 to be moved to a new position. For example, a button 118 can be depressed to a free configuration, causing teeth of lock mating feature 136 to disengage from teeth of body mating feature 138 to allow a position of the stop 114 to be adjusted. Button 118 may then be released to engage the teeth in a locked configuration, setting the position of the stop 114.

In some embodiments, tool body 102 can include markings 140 along a top surface 142 of tool body 102 that indicate the relative positioning of an installed window covering based on a corresponding bracket position to help the installer determine where to position stop 114. In some embodiments, the markings indicate a distance between the stop 114 and the distal end 106 of the tool body 102. A user may reference an installation guide for instructions on which settings and markings to use based on the particular bracket, window, window cover system, and/or application. Such markings can eliminate the need to snap the bracket 110 into a headrail of the window covering for measurements of bracket depth as required in conventional installations. Stop 114 can also be configured to ensure that bracket 110 is square with the edge of the opening. For example, stop 114 can have a flat distal surface 120 that can be squared with an edge of the opening. In other words, stop 114 can have distal surface 120 transverse or orthogonal relative to a longitudinal axis of bracket 110 and/or tool body 102 such that by positioning the distal surface 120 flush against the edge of the opening, the bracket 110 is properly aligned. Due to the ability to easily set a bracket position, the ability to ensure the bracket 110 is aligned and installed square to the edge of the window opening, and the ability to secure the bracket 110 to the recess while holding the tool 100, there is no need for additional measurements or marking a position for fasteners for the bracket 110 as in conventional installation methods, saving the installer considerable time and effort.

Figure 5:
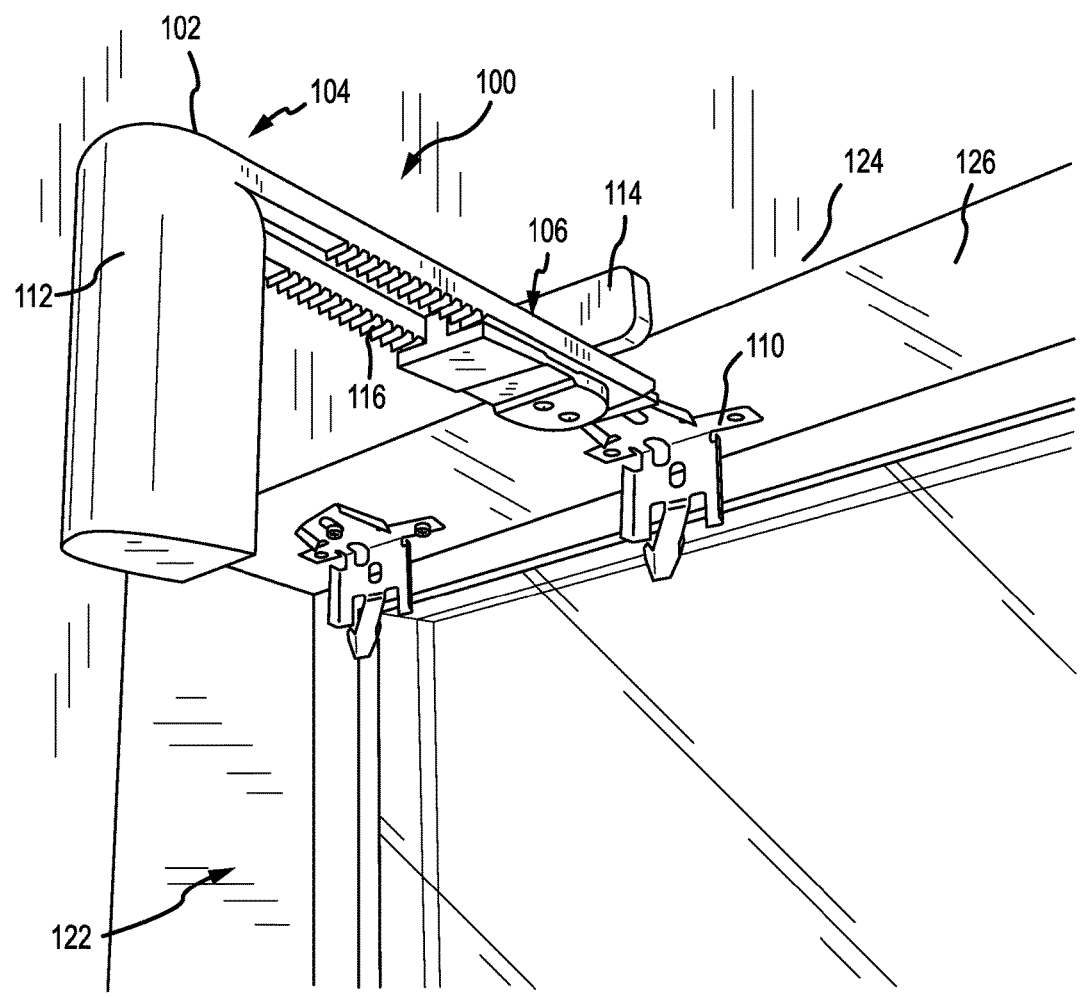
FIG. 5 shows the bracket installation tool of FIG. 1 positioned within a window opening according to embodiments.

FIG. 5 shows the bracket installation tool 100 of FIGS. 1-4 being used to install an inside mount bracket. The tool 100 is positioned within a window casement or recess 122 with stop 114 positioned against an exterior surface 124 of recess 122. A top surface of bracket 110 disposed within hitch 108 is positioned flush against a top interior surface 126 of recess 122. An installer can hold the tool 100 in this position using handle 112 attached at a proximal end 104 of the tool body 102. A portion of the bracket 110 to be secured to the top interior surface 126 remains exposed. In this position, the installer can directly fasten the bracket 110 to the top surface 126, for example, by inserting a screw or other fastener through one or more apertures of the bracket 110 and into the top surface 126. Once bracket 110 is secured, the user may pull on the tool 100 to release the bracket 110 from the hitch 108 such that another bracket may be installed and/or a window cover may be secured within the installed brackets.

Figure 6:
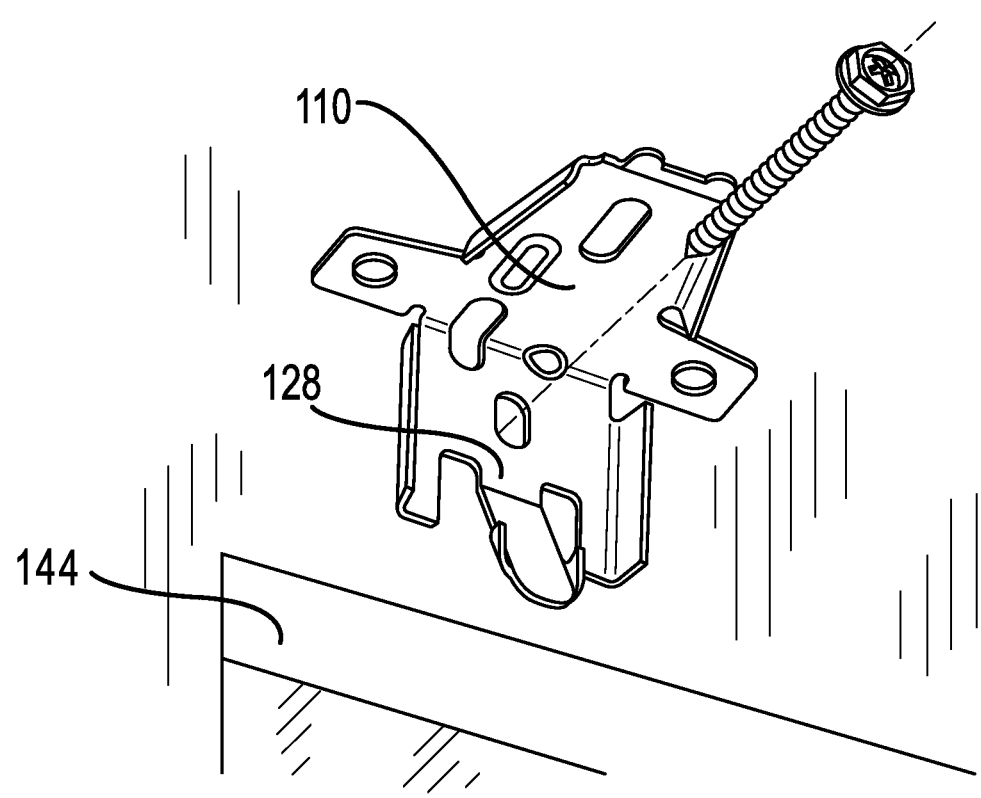
FIG. 6 depicts a bracket in an outside mount configuration according to embodiments.

The window bracket installation tools described herein may also be used to install brackets, such as bracket 110, in outside and/or end mount applications. As shown in FIG. 6, a rear flange 128 of bracket 110 is positioned on a vertical surface outside and above a casement or opening 144 for a window in an outside mount configuration. Here, the bracket 110, and subsequently the window cover, are positioned above and outside a window casement or opening 144. This mounting technique is often used in non-casement window applications. As seen in FIG. 7, the bracket installation tool 100 as described herein in FIGS. 1-5 may be positioned in an upward direction such that stop 114 is flush against a top interior surface 146 of the window opening 144. Here, stop 114 sets a relative mounting height of the bracket 110, rather than a mounting depth as in inside mount configurations. This ensures that the bracket 110 is positioned a set distance from a window edge 148 and square with the opening 144.

Figure 8:
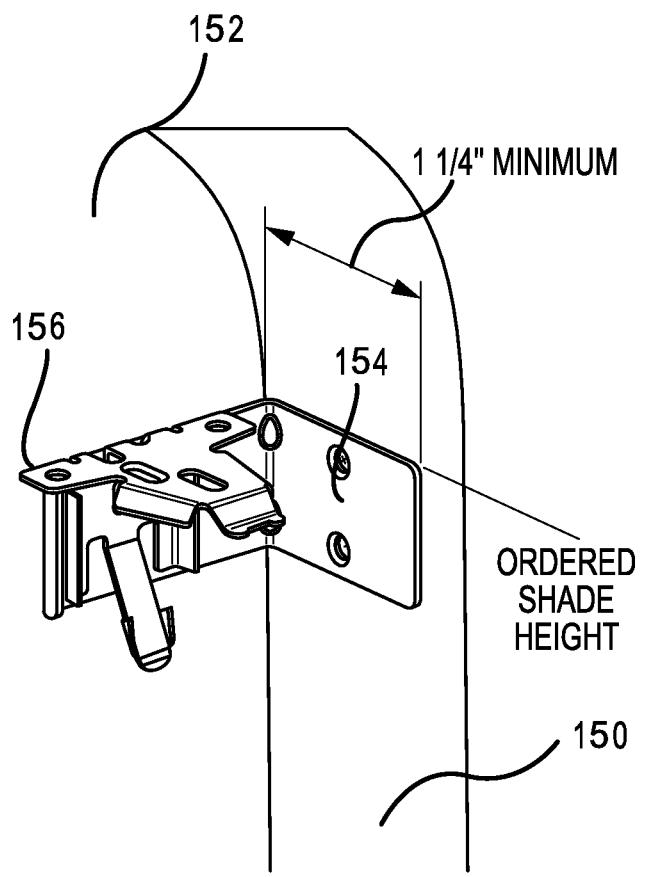
FIG. 8 depicts a bracket in an end mount configuration according to embodiments.
Figure 9:
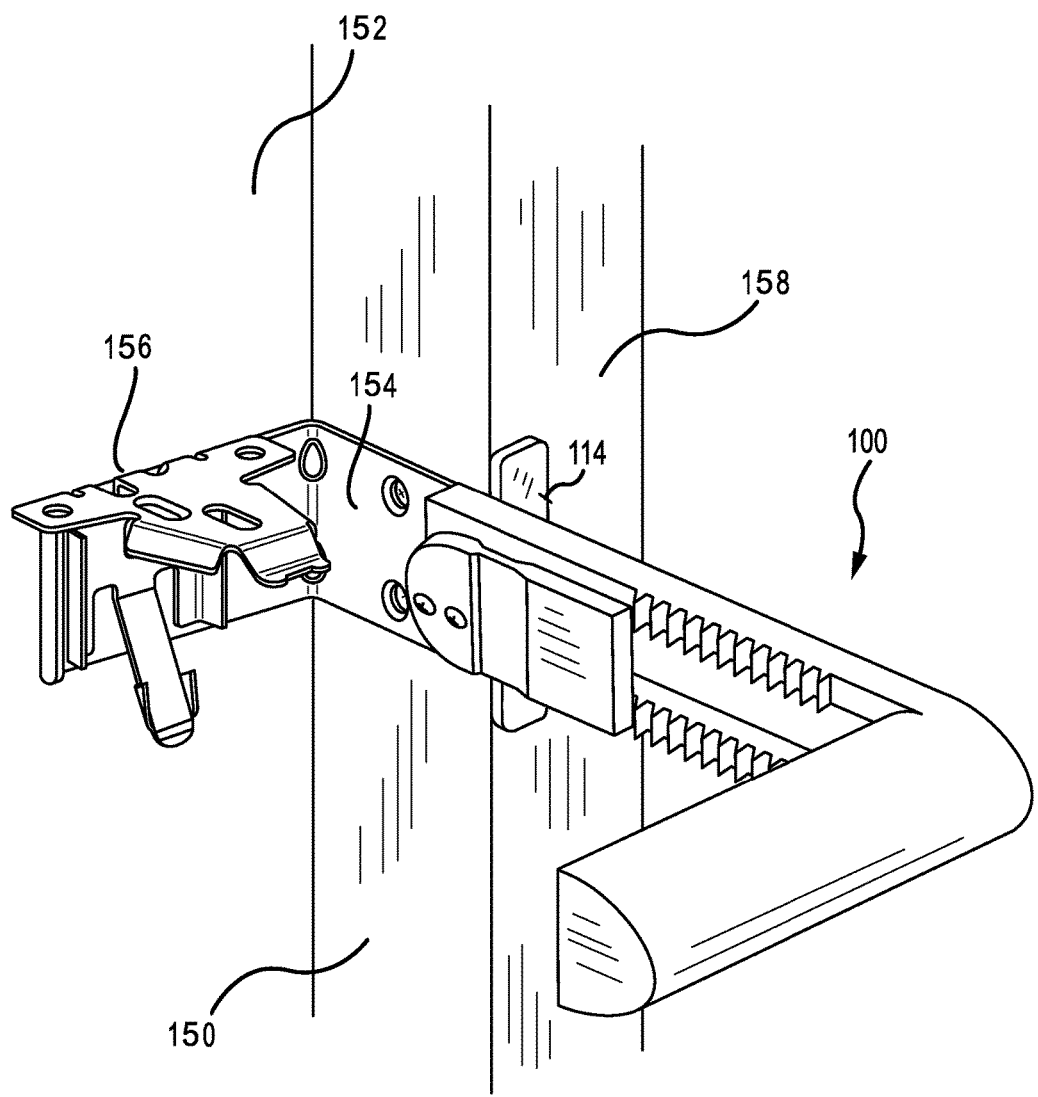
FIG. 9 shows a bracket installation tool holding a bracket in an end mount configuration according to embodiments.

A bracket 156 may be positioned against an interior side surface 150 of a window opening 152 in an end mount configuration, such as shown in FIG. 8. Here, a flange 154 of bracket 156 is coupled to interior side surface 150. Such mounting techniques are often used in arched windows where a typical inside mount from a top of the window may not be feasible and where the building owner wishes to preserve the arched appearance. As seen in FIG. 9, the bracket installation tool 100 as described herein in FIGS. 1-5 may be positioned sideways such that stop 114 is flush against an exterior surface 158 of the window opening 152. Here, stop 114 sets a relative mounting depth of the bracket 156. This ensures that the bracket 156 is positioned a set distance from exterior surface 158 and square with the opening 152.

Figure 10:
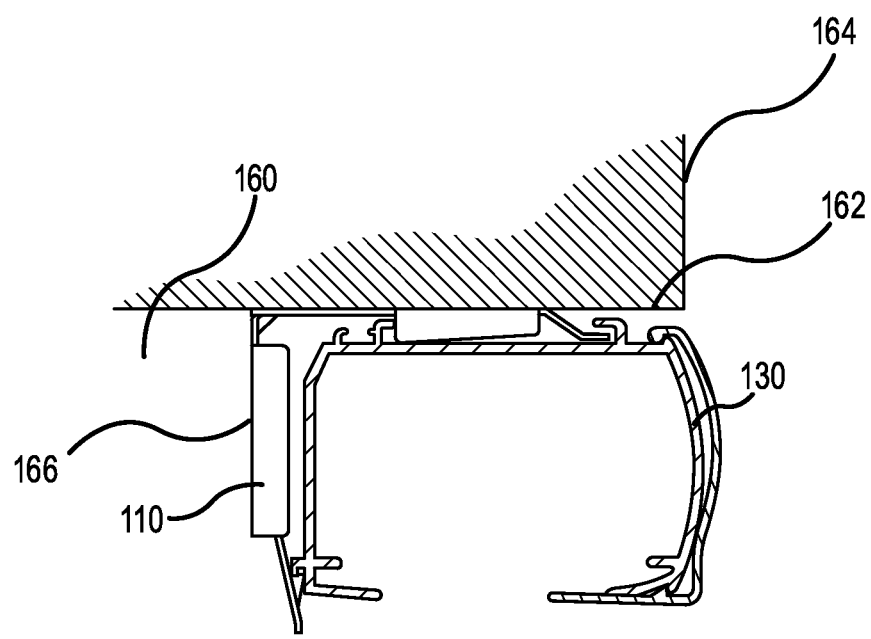
FIG. 10 depicts an inside mounted bracket securing a window covering according to embodiments.

FIG. 10 depicts bracket 110 installed within an opening 160 of a casement window. Bracket 110 is secured to a top interior surface 162 of the opening 160 and secures a headrail 130 of a window cover system within the opening 160. As described above, other installation configurations are possible using bracket 110 and headrail 130. For example, an outside mount configuration may be installed using tool 100 by positioning bracket 110 on a vertical surface 164 outside of and above the opening. The bracket 110 may be secured using a back surface 166 of the bracket 110 against the vertical surface 164. In some embodiments, spacer blocks and/or extension brackets may be included to set a proper depth of the bracket 110.

Figure 11:
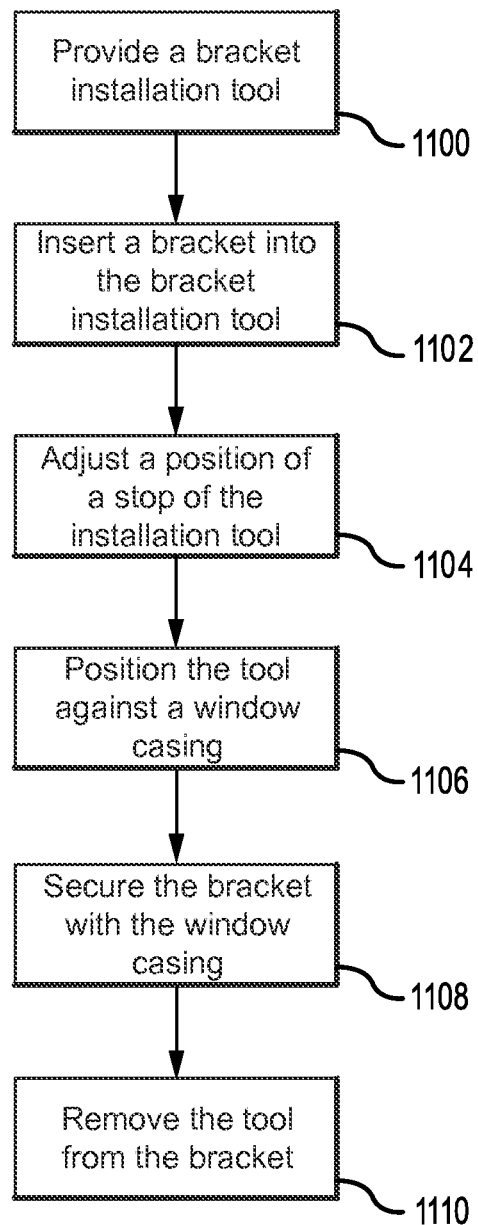
FIG. 11 depicts a flowchart of a method of using the bracket installation tool of FIG. 1 according to embodiments.

FIG. 11 depicts a flowchart showing a method of installing a window bracket using the bracket installation tool of FIGS. 1-10. For example, a bracket installation tool may be provided at 1100. The bracket installation tool 1100 may be as described herein, and may include a tool body having a length, a proximal end, and a distal end. In some embodiments, a top surface of the tool body comprises a plurality of measuring indicia that indicate a position of the stop relative to the distal end of the tool body. The tool may also include a handle coupled with the proximal end of the tool body and a receiver hitch coupled with the distal end of the tool body. The receiver hitch may be configured to receive a portion of a bracket for a window covering. The tool may further include a stop extending from the tool body. A portion of a bracket may be inserted into and secured within a slot of the tool at 1102. A portion of the bracket configured to receive a fastener may be exposed when the bracket is secured within the slot.

The method may include adjusting a position of the stop relative to a length of the tool body at 1104. This sets a desired position of the bracket and to ensure the bracket is positioned as desired, such as squared 90 degrees, relative to a window opening. For example, the position of the stop can determine whether the installed window will protrude from the opening, be flush with an outer edge of the opening, be positioned above the window, and/or be recessed within the opening of the window. The position of the stop may be adjusted, for example, by sliding the stop within a longitudinal slot defined by the tool body to a desired position along the body of the tool, although other mechanisms for setting the position of the stop can be utilized. In some embodiments, a lock mechanism may be coupled with or formed integrally with the stop. The lock mechanism may be manipulated to a free configuration such that a lock mating feature of the lock mechanism is disengaged from a body mating feature of the tool body. The lock mechanism may then be manipulated, upon sliding the stop within the slot, to a locked configuration such that the lock mating feature engages the body mating feature to maintain the stop in the adjusted location. The lock mechanism may be manipulated using an actuator coupled with the locking mechanism. In some embodiments, the body mating feature and the lock mating feature comprise intermeshing teeth, such as one or more rows of intermeshed teeth extending along one or more sides of the longitudinal slot. In some embodiments, the actuator is coupled with the lock mechanism and protrudes from a bottom side of the tool body through the longitudinal slot.

At 1106, the tool may be positioned such that a distal surface of the stop is adjacent a surface of a window casing to maintain the bracket in a desired position relative to the window casing. The positioning of the tool may vary based on the size and type of bracket and/or based on the type of mount used. For example, inside mount, outside mount, and end mount applications may require the tool be oriented differently as described in the figures above. At 1108, the bracket may then be secured with the window casing, such as by using one or more fasteners. This may be done without marking any fastener and/or bracket positions. For example, the bracket may be screwed into the window casing while the installer holds the bracket in the desired position using the bracket installation tool. The tool can then be pulled away from the secured bracket such that the bracket is released from the receiver hitch at 1110. In some embodiments, the installer can pull on a handle of the bracket installation tool to remove the bracket from the tool. The installer can then secure any additional brackets in the window recess using the tool with the same position settings.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Processes and methods described herein may be performed in any order, may include additional steps, omit steps, and/or include various combinations thereof. It will be appreciated that various combinations of features described herein may be utilized. For example, features not discussed or shown together may be combined in accordance with embodiments of the invention, while other embodiments may include additional features and/or may omit one or more features disclosed herein.

What is claimed is:

1. A bracket installation tool, comprising:
 a tool body having a top, a length extending along a longitudinal axis of the tool body, a proximal end, and a distal end;
 a handle coupled with the proximal end of the tool body;
 a receiver hitch coupled with the distal end of the tool body, the receiver hitch configured to receive a portion of a bracket for a window covering; and
 a stop movably engaged with the tool body such that the stop is movable along at least a portion of the length of the tool body to set an insertion depth of the distal end of the tool body relative to a window casement, and wherein the stop extends transverse relative to the receiver hitch such that the stop may engage the window casement and position the bracket with respect to the window casement, wherein the stop comprises a generally flat plate having a distal surface that is substantially transverse to the length of the tool body.

2. The bracket installation tool of claim 1, wherein:
 the hitch defines an opening extending through a portion of the distal end that is at least partially surrounded by the tool body, wherein the hitch is configured to receive the portion of the bracket within the opening.

3. The bracket installation tool of claim 1, wherein:
 the handle is substantially transverse to the longitudinal axis.

4. The bracket installation tool of claim 1, wherein:
 a top surface of the tool body comprises a plurality of measuring indicia that indicate a position of the stop relative to the distal end of the tool body.

5. The bracket installation tool of claim 1, wherein:
 the stop comprises a lock mechanism;
 the tool body comprises a body mating feature disposed along the length;
 in a locked configuration a lock mating feature of the lock mechanism engages the body mating feature to fix a location of the stop such that the bracket is maintained at a desired mounting site relative to a surface of a window casement when a distal surface of the stop is positioned adjacent the surface; and
 in a free configuration the lock mating feature and the body mating feature are disengaged such that the lock mechanism and the stop are slidable relative to the top of the tool body.

6. The bracket installation tool of claim 5, further comprising:
 an actuator coupled with the lock mechanism and protruding from a bottom side of the tool body to the top of the tool body, the actuator being configured to manipulate the lock mechanism between the locked configuration and the free configuration.

7. The bracket installation tool of claim 5, wherein: the body mating feature and the lock mating feature comprise intermeshing teeth.

8. The bracket installation tool of claim 1, wherein:
the stop comprises a lock mechanism;
in a locked configuration the lock mechanism fixes a location of the stop such that the bracket is maintained at a desired mounting site relative to a surface of a window casement; and
in a free configuration the lock mechanism allows movement of the stop.

9. The bracket installation tool of claim 1, wherein:
the stop comprises a lock mechanism;
in a locked configuration a lock mating feature of the lock mechanism engages the body mating feature to fix a location of the stop such that the bracket is maintained at a desired mounting site relative to a surface of a window casement when a distal surface of the stop is positioned adjacent the surface; and
in a free configuration the lock mating feature and the body mating feature are disengaged such that the lock mechanism and the stop are slidable with respect to each other.

10. A bracket installation tool, comprising:
a tool body having a top, a length, a proximal end, and a distal end;
a handle coupled with the proximal end of the tool body;
a receiver hitch coupled with the distal end of the tool body, the receiver hitch configured to receive a portion of a bracket for a window covering; and
a stop extending transverse from the top of the tool body to a position the bracket relative to a surface of a window casement when a distal surface of the stop is positioned against the surface, wherein the stop is movably engaged with the tool body such that the stop is movable along at least a portion of the length of the tool body to set an insertion depth of the distal end of the tool body relative to a window casement, and wherein the stop comprises a generally flat plate having a distal surface that is substantially transverse to the length of the tool body.

11. The bracket installation tool of claim 10, wherein:
the tool body defines a longitudinal slot extending along the length; and
the stop is movable within the slot.

12. The bracket installation tool of claim 11, wherein:
the stop comprises a lock mechanism;
in a locked configuration the lock mechanism fixes a location of the stop within the slot such that the bracket is maintained at a desired mounting site relative to a surface of a window casement; and
in a free configuration the lock mechanism allows movement of the stop within the slot.

13. The bracket installation tool of claim 10, wherein:
a top surface of the tool body comprises a plurality of measuring indicia that indicate a position of the stop relative to the distal end of the tool body.

14. The bracket installation tool of claim 10, wherein:
the handle is substantially transverse to the longitudinal axis.

15. A bracket installation tool, comprising:
a tool body having a top, a length extending along a longitudinal axis of the tool body, a proximal end, and a distal end with a distal tip;
a handle coupled with the proximal end of the tool body;
a receiver hitch at the distal tip, the receiver hitch comprising a laterally oriented slot configured to receive a portion of a bracket for a window covering; and
a stop movably engaged with the tool body such that the stop is movable along at least a portion of the length of the tool body to set an insertion depth of the distal end of the tool body relative to a window casement, and wherein the stop is configured to engage the window casement and position the bracket against the window casement, wherein the stop comprises a generally flat plate having a distal surface that is substantially transverse to the length of the tool body.

* * * * *